United States Patent [19]
Harada et al.

[11] Patent Number: 5,497,490
[45] Date of Patent: Mar. 5, 1996

[54] AUTOMATIC RECONFIGURATION OF ALTERABLE SYSTEMS

[75] Inventors: Naoki Harada, Hiratsuka; Ken Inoue, Yamato; Masahiko Shinomura, Machida, all of Japan

[73] Assignee: International Business Machines Corporation, Armonk, N.Y.

[21] Appl. No.: 911,564

[22] Filed: Jul. 8, 1992

[30] Foreign Application Priority Data

Oct. 11, 1991 [JP] Japan .................................. 3-290405

[51] Int. Cl.$^6$ .............................. G06F 11/08; G06F 9/00
[52] U.S. Cl. .................... 395/700; 364/DIG. 1; 364/280.2; 364/280; 364/268
[58] Field of Search ...................... 395/700; 364/DIG. 2

[56] References Cited

U.S. PATENT DOCUMENTS

| | | | |
|---|---|---|---|
| 4,403,303 | 9/1983 | Howes et al. | 364/900 |
| 5,014,193 | 5/1991 | Garner et al. | 364/200 |
| 5,038,320 | 8/1991 | Heath et al. | 364/900 |
| 5,247,682 | 9/1993 | Kondou et al. | 395/700 |
| 5,265,238 | 11/1993 | Canova, Jr. et al. | 395/500 |

FOREIGN PATENT DOCUMENTS

| | | |
|---|---|---|
| 0281999 | 9/1988 | European Pat. Off. . |
| 0364115 | 4/1990 | European Pat. Off. . |
| 2218549 | 11/1989 | United Kingdom . |

*Primary Examiner*—Kevin A. Kriess
*Attorney, Agent, or Firm*—Robert S. Babayi

[57] ABSTRACT

A computer unit and multiple I/O adapter units are interconnectable in a variety of different plug attachment configurations which may be frequently altered in normal use of the system. An arrangement is provided for automatically initializing adapter units which are currently connected to the computer unit to operating states uniquely suited to the current configuration of connections. In the arrangement, non-volatile storage means retentively stores multiple sets of configuration state information, each set corresponding to a different configuration of connections between the adapter units and the computer unit. Means operating during each initialization of the system detects identities (ID's) of adapter units currently connected to the computer unit, and compares them to ID's associatively stored with the configuration state information. When a corresponding set of ID's is found, the associated configuration state information is retrieved and used for initializing the currently connected adapter units to operating states uniquely suited to the detected configuration of ID's. In the disclosed embodiment, information associated with the adapter unit configuration existing when system power was last turned off is stored in both a non-volatile RAM (NVRAM) and in a reserved area of a hard disk drive (HDD) which holds information associated with both the presently existing adapter configuration and previously existing configurations. Detected ID's of currently connected adapter units are compared first to identity information in NVRAM, and if a match is detected the associated state information in NVRAM is used to initialize the currently connected adapter units. If a mismatch is detected, the detected unit ID's are compared to sets of ID's contained in index functions stored in the HDD. If a match is found in this comparison, configuration state information associated with the respective index function is retrieved, written to NVRAM and applied to the currently connected adapter units. This arrangement is particularly useful for automatically initializing portable computer systems which can operate either standalone or docked/connected to one or more desktop expansion units.

6 Claims, 5 Drawing Sheets

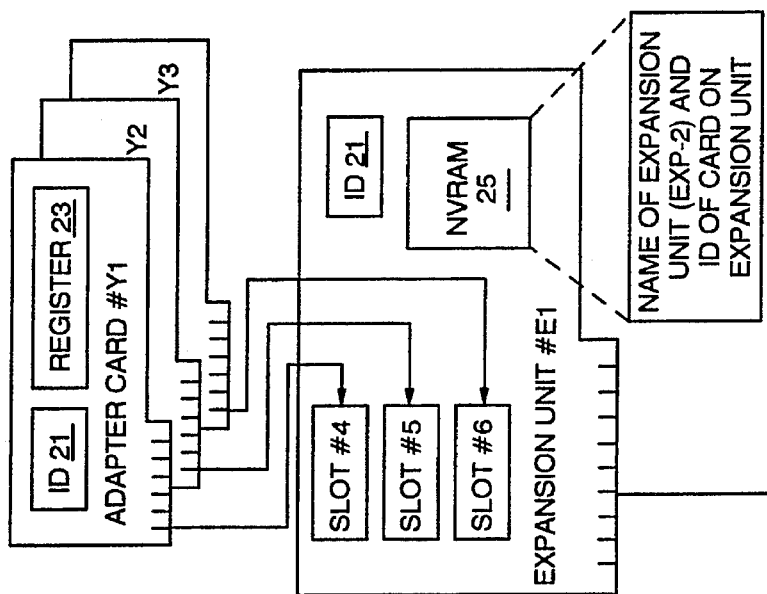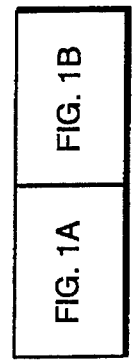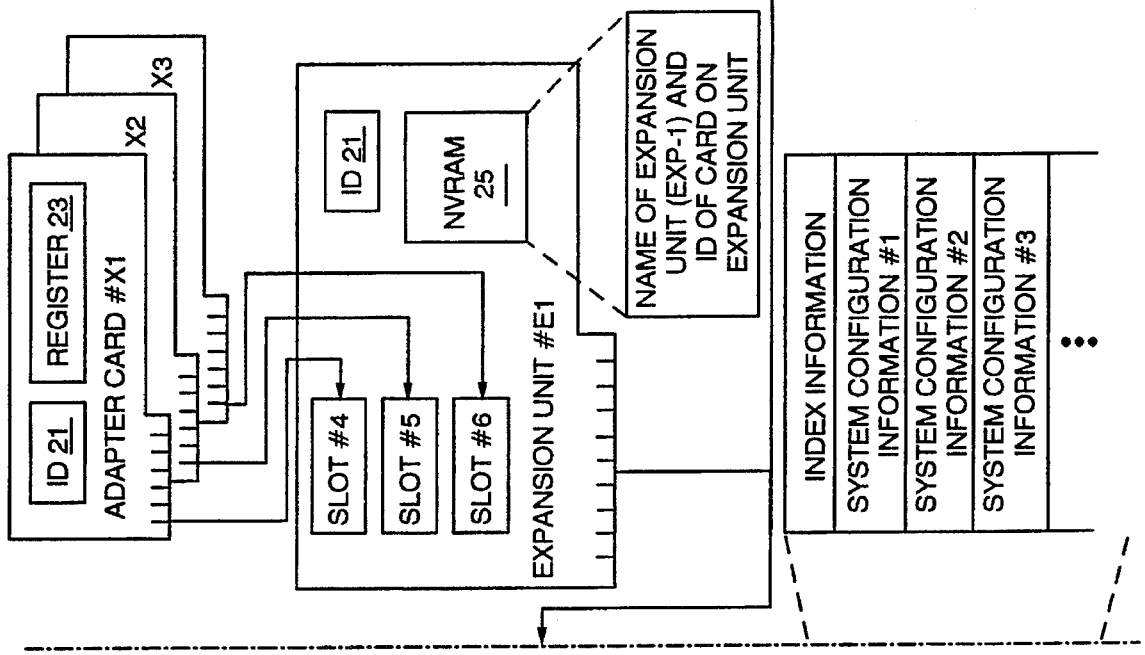
FIG. 1B
FIG. 1A | FIG. 1B
FIG. 1

AUTOMATIC RECONFIGURATION OF ALTERABLE SYSTEMS

FIELD OF THE INVENTION

This invention relates to computer systems which automatically configure their I/O (input/output) attachments when power is turned on.

BACKGROUND OF THE INVENTION

In existing computer systems, I/O adapters have stored identifier (ID) functions which are detected by the system during its initialization process, and enable the system to determine if its I/O configuration has changed since power was last turned off. If the configuration has not changed, the initialization process automatically conditions the adapters to operating states suited to the existing configuration. Thus, it is not necessary for the system to repeat any "setup" procedures associated with establishing the operating states of this configuration.

When an I/O adapter card is first installed into an attachment slot of the system, which previously was either vacant or connected to a different adapter, a setup process is initiated by the system which requires interaction between the system and a user. In this process, configuration state information relating to the newly installed adapter card is created by the system and stored in a non-volatile system memory (NVRAM) along with a copy of the adapter's ID function. Each time that power is turned on the system executes a power on self test (POST) procedure in which it determines (among other things) if ID's associated with the slots are the same as they were when power was last turned off. If the ID's haven't changed, the system causes associated configuration information to be transferred from NVRAM to volatile registers in respective adapter cards, thereby conditioning the adapter cards to operating states suited to the current configuration of the system. If the ID's have changed, another setup process is initiated.

For details of the foregoing, refer to U. S. Pat. No. 5,038,320 to Heath et al, assigned to the assignee of the present application.

The setup procedure can be time consuming, inasmuch as it may require the system user to deactivate and reboot the system several times, but it generally does not overly delay productive use of the system since adapter installation changes usually are made infrequently.

However, in some systems, frequent changes of adapter configurations may be necessary for practical operation of the system. For example, a notebook computer system may be used at some times as a stand-alone portable computer and at other times as part of a desktop system. In the desktop configuration, the computer may be connected to an expansion unit which provide additional functions such as communication, printing, extra memory/storage, etc.

In such frequently changing environments it is desirable to be able to avoid having to repeat setup processes to recreate configuration state information that the system has previously created. The present invention provides such capability.

OBJECTS OF THE INVENTION

An object of the invention is to provide a mechanism and associated method for enabling a computer system to avoid having to repeat previously executed setup procedures when its configuration of attachments is changed to a configuration that had existed earlier.

Another object is to provide a mechanism and method for enabling a computer system to automatically and efficiently initialize devices, that have just been attached to the system in a connection configuration which existed at some previous time, without user interaction and in a time which is much shorter than the time that would be required to accomplish the initialization via a setup process involving user interaction.

SUMMARY OF THE INVENTION

These objects are realized by storing a backup copy of configuration state information, relative to each configuration initially established by execution of an otherwise conventional setup procedure (conventional except for storage of the backup copy). The backup copy is stored in a secondary storage device, in association with adapter identifier's (ID's) which identify the devices currently connected to the system, in a form in which the information is always accessible to be automatically retrieved and re-used by the system without user action.

When a device adapter is first attached to the system, a user/installer is guided interactively through a conventional setup procedure by which system configuration state information associated with the configuration formed by attachment of that adapter is created and stored in a system NVRAM. However, in accordance with the present invention and as an extension of the setup procedure, a backup copy of the same information is stored in an automatically retrievable form, in a secondary non-volatile store present in the system; e.g. a hard disk drive (HDD) storage device. The backup copy is stored in association with identifiers (ID's) corresponding to the currently attached adapters, and is thereby automatically retrievable in association with the current attachment configuration, whenever that configuration is re-established.

At each start-up, the system POST (power on self test) process detects ID's of adapters which are currently attached to the system, and determines if they correspond to ID's currently stored in system NVRAM (i.e. it determines if the current I/O configuration is the same as that which existed when system power was last turned off). If the ID's correspond, POST transfers configuration state information from its NVRAM to the adapters as before, establishing the adapters in operating states suited to the current configuration.

However, if any ID does not correspond, the system does not immediately call for setup action. Instead, POST attempts to locate a backup copy of configuring information associated with the currently detected configuration of adapter ID's. If a backup copy is not located, setup action is evoked. But if a corresponding backup copy is found, POST retrieves it automatically (without user interaction), transfers a copy of it to NVRAM and uses the transferred information to set the currently attached adapters into states suited to their aggregate configuration.

The portion of the secondary storage device used for storing backup configuration information is either exclusively reserved for that function (i.e. for exclusive use only by the POST process) or otherwise protected against being overwritten during normal operation of the system.

It should be understood that when the HDD or other secondary storage device is first installed in the system, the system may be operated to create configuration information relative to a variety of different devices, which may or may not be eventually attached, and to store backup copies of that information in the secondary storage device; provided of course that the storage device has sufficient capacity to allow for such usage. It should also be understood that if the NVRAM memory has sufficient capacity it may be used to store both the principal copies and backup copies of the configuration information.

These and other features, effects, advantages and benefits associated with the present invention may be more fully understood and appreciated by considering the following description and claims.

DESCRIPTION OF THE DRAWINGS

FIGS. 1A and FIG. 1B collectively show a block diagram of a computer system embodying the invention.

DETAILED DESCRIPTION OF THE INVENTION

Figure 1A:
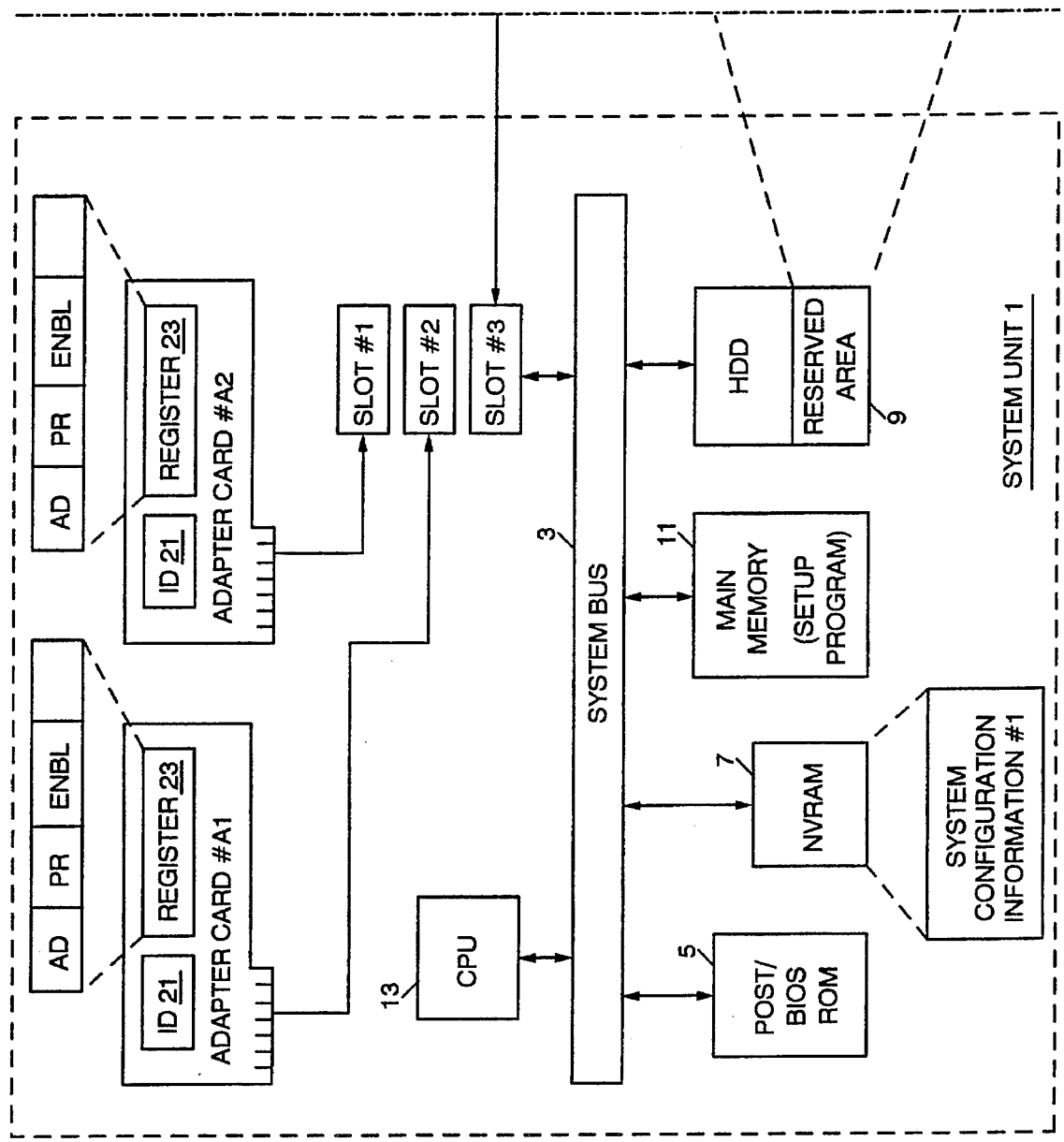

FIGS. 1A and 1B collectively show an embodiment of a data processing system containing a computer system unit 1 constructed according to the present invention. Unit 1 contains a system bus 3 connected with multiple sockets/slots, #1, #2 and #3, into which I/O attachment cards may be inserted. Such cards may be used to control various different types of peripheral device apparatus (e.g. disk drive, printer, communication device, extended memory device, etc.) and are interchangeably insertable into any of the sockets. Also connected to bus 3 are a ROM (read only memory) 5, for storing its POST and BIOS (basic input output system) programs, a NVRAM (non-volatile RAM) memory 7 for storing configuration information, a non-volatile secondary storage device HDD (hard disk drive) 9, a main memory 11, and a CPU (central processing unit) 13. The foregoing elements may all be commonly housed as integral parts of unit 1.

To create configuration information, a setup program is used. The setup program is contained in a utility program. The utility program is contained either on a reference diskette supplied to the user with unit 1, which operates through a not-shown diskette drive included in the unit, or it may be contained on HDD 9.

As shown in FIG. 1, slots #1 and #2 in the system unit have attached thereto respective adapter cards #A1 and #A2, and slot #3 in the system unit has attached to it either expansion unit #E1 or expansion unit #E2 when the system unit is used in its desktop configuration. Each expansion unit has multiple slots #4, #5 and #6 for attachment of additional adapter cards; respectively for attachment of cards #X1, #X2, and #X3 to expansion unit #E1, and cards #Y1, #Y2 and #Y3 to expansion unit #E2.

Each adapter card and expansion unit has a unique identifier (ID) value for identifying its respective type of apparatus. Each ID consists of a predetermined number of bits which are permanently stored on the respective card in respective non-volatile storing means 21. Each card also contains a (volatile) register 23 which can store associated configuration state information when system power is on. Such configuration state information can be stored in non-volatile form in NVRAM 7, and transferred to the registers 23 of attached cards by POST if the configuration of the system has not changed since it was last deactivated.

The configuration state information includes, for example, address factors (AD) assigning portions of system (memory and/or I/O) address space to the respective card, interrupt priority level for interrupt requests presented to the system unit by the respective card, information allocating different priorities (PR) to cards of the same type, and/or information ENBL for enabling and disabling cards of the same type which are redundantly configured in the system. Based on this information, data is efficiently transferrable between CPU 13 and the cards, and between cards.

In addition to means 21 for storing their ID values, expansion units #E1 and #E2 each have NVRAM's 25 for storing associated configuration information. Such information is written from system unit 1 to respective NVRAM's 25 during execution of the setup program after connection of respective expansion units to the system. Each NVRAM 25 contains ID values of all adapter cards currently attached to the I/O sockets/slots on the respective expansion unit. Each NVRAM 25 also contains "name" information uniquely identifying the respective expansion unit; for example EXP-1 for unit #E1 and EXP-2 for unit #E2. Such names are required even if the units and their respective attachments are identical, in order to allow the system unit 1 to be able to distinguish between the expansion units (e.g. to be able to create and write different configuration information to those units; one possible use of which could be to configure one unit as active and the other as standby in a redundant arrangement).

NVRAM 7 contains system configuration information for the last active configuration of unit connections in the system; i.e. the configuration established at the last initialization of the system. Such information includes identifier and configuration state information, for each adapter card and expansion unit connected in the system slots in the associated configuration. Whenever a new configuration of unit attachments is formed, corresponding system configuration information is created by the setup program and stored in NVRAM 7. NVRAM 7 is continuously powered by system power and/or a not-shown back-up battery. In the collective illustrations of FIGS. 1A and 1B NVRAM 7 is shown holding a particular set of system configuration information designated "system configuration information #1 ". For purposes of the following discussion, it is assumed that system configuration information #1 is associated with a configuration in which slot #3 is empty, and slots #1 and #2 respectively have adapter cards #A1 and #A2 connected to them.

FIGS. 1A and 1B collectively show that hard disk drive (HDD) 9 contains a special reserved area used for storing "backup" copies of system configuration information in accordance with the invention. This area is reserved exclusively for storing such information (meaning that it can not be available to the operating system or application programs of system unit 1 for storing any other information). The reserved area of HDD 9 can be used to store plural sets of different system configuration information; one set corresponding to the latest configuration #1, and others corresponding to other system configurations (#2, #3, etc.) previously formed and set up. For example, system configuration information #2 could be associated with connection of adapter cards #1 and #2 to slots #1 and #2 respectively, and connection of expansion unit #E1 to slot #3, and system configuration information #3 could be associated with connection of adapter cards #1 and #2 to system slots #1 and #2 respectively and connection of expansion unit #E2 to slot #3.

Viewing system unit #1 as a contemporary laptop or notebook type system, system configuration information #1 would be associated with standalone operation of the system with only cards #1 and #2 internally installed, system configuration information #2 and #3 would be associated with operation of the system unit docked (attached) to expansion unit #E1 via system slot #3, with cards #1 and #2 respectively attached to system slots #1 and #2 and cards #X1, #X2 and #X3 attached to respective slots in unit #E2, and system configuration information #3 would be associated with operation of the system docked to expansion unit #3, with cards #1 and #2 attached to the system slots as before and cards #X1, #X2, and #X3 attached to respective slots in unit #E3.

Figure 2:
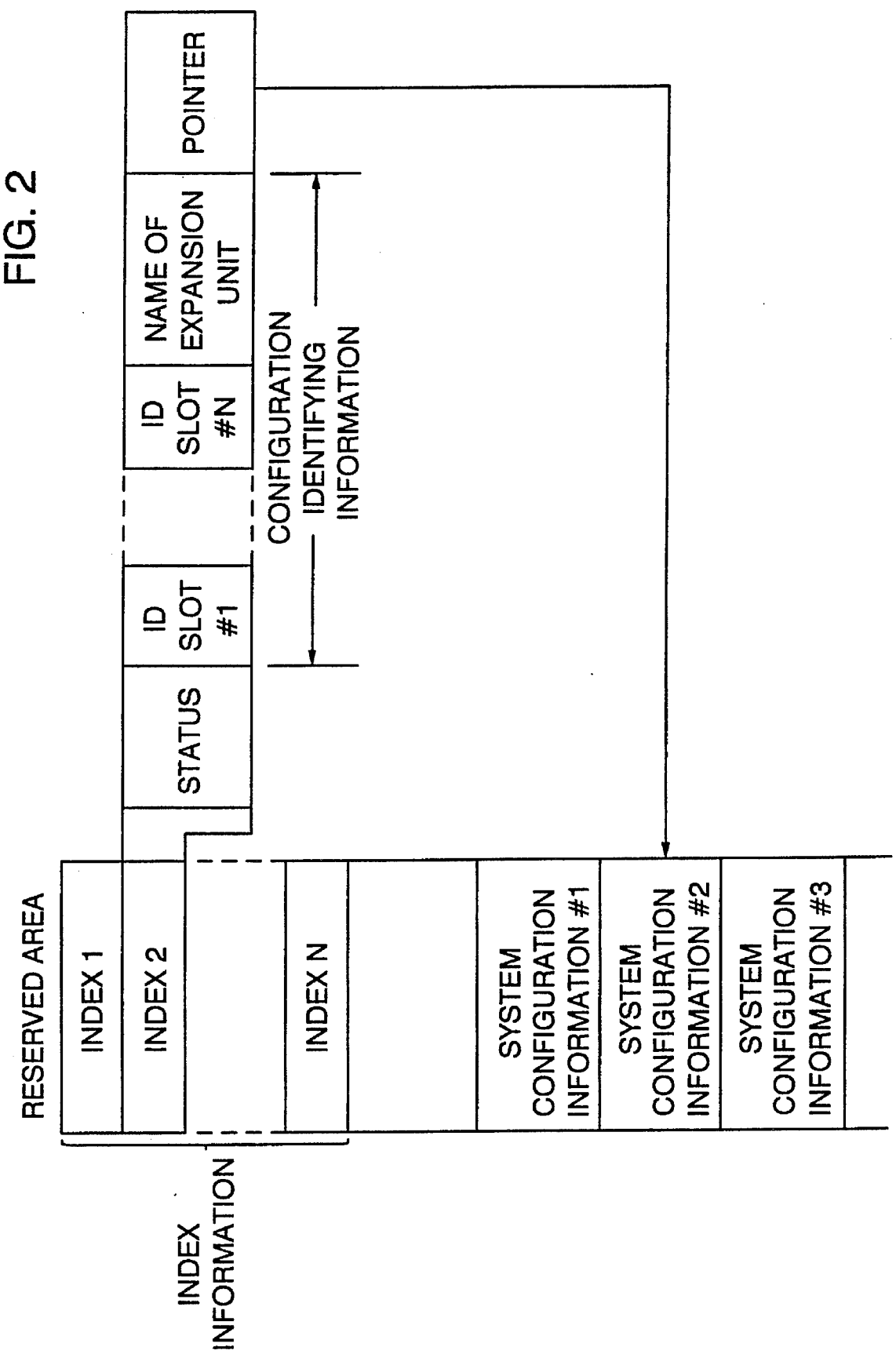
FIG. 2 illustrates storage of backup copies of information, in the hard disk drive unit of the embodiment in FIG. 1, that is useful by the system of that embodiment for configuring device adapters currently attached to I/O slots thereof.

FIG. 2 shows an arrangement in accordance with the invention for locating backup copies of sets of system configuration information within the reserved area of HDD 9. Each time the system set up program is run relative to a new system configuration #j (j=1,2, . . . ), the (setup) program creates associated system configuration information #j which is stored in NVRAM 7. As noted previously. this information includes card and/or expansion unit identifiers, and configuration state information for respective units. This information is also stored in the reserved area of HDD 9, with the unit identifiers located in an index #j and the state information located in a space indicated by a pointer value in the respective index #. Index values for all established sets of system configuration information are stored in successive positions within a first part of the reserved area, as shown in FIG. 2, and associated sets of configuration state information are stored in another part of the reserved area, the location of each being indicated by the pointer in the respective index. Thus, each set of system configuration information #j is retrievable by reference to the associated index #j which in turn is locatable by association with respective unit identifiers (card ID and expansion unit names associated with the respective configuration).

Each index value also contains status information which indicates the type of identifying information contained in that index (e.g. card ID's only, expansion unit name only, or both), to facilitate efficient scanning of the indexes by POST when retrieval of a backup copy of state information is required.

Figure 3:
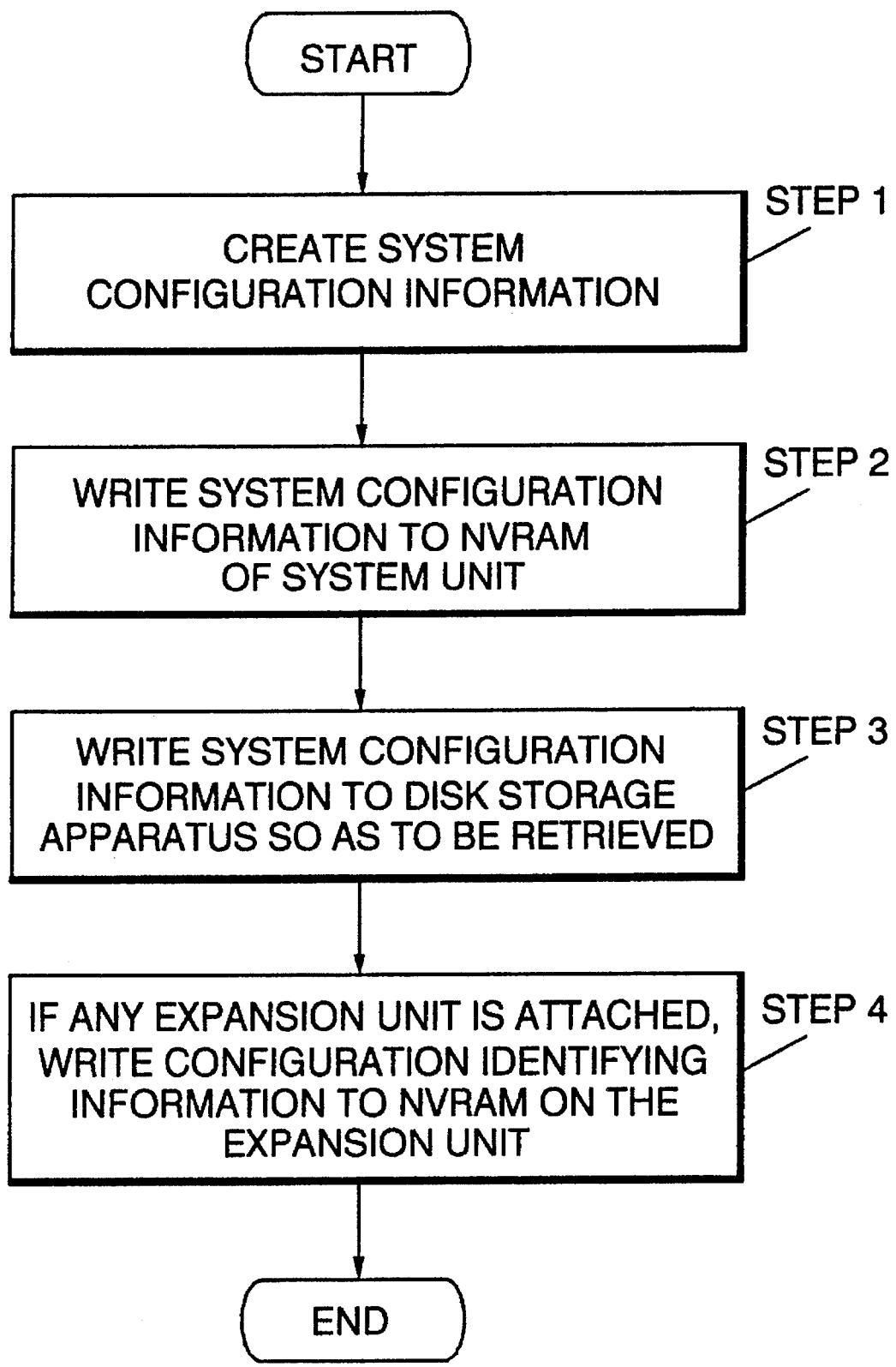
FIG. 3 is a flowchart showing the setup procedure in accordance with the invention relative to the embodiment of FIG. 1.

FIG. 3 shows a procedure for creating and storing system configuration information in accordance with the invention. The information is created in step 1, with reference to card ID's and expansion unit names detected by interrogating the system unit slots, and written to NVRAM 7 in step 2. Steps 1 and 2 corresponds to the prior art setup procedure used in contemporary computer systems. In step 3 a backup copy of the same system configuration information is written to the reserved area of HDD 9 in a form suitable for retrieval; e.g. in the form shown in FIG. 2 with associated index information. If the configuration does not include an expansion unit, the procedure ends after step 3. However if the configuration includes an expansion unit, configuration identifying information associated with that unit (unit name and ID's of adapter cards attached to the unit's slots) is written to NVRAM on the expansion unit (NVRAM 25 in FIGS. 1A and 1B), in step 4, to complete the process.

Figure 4:
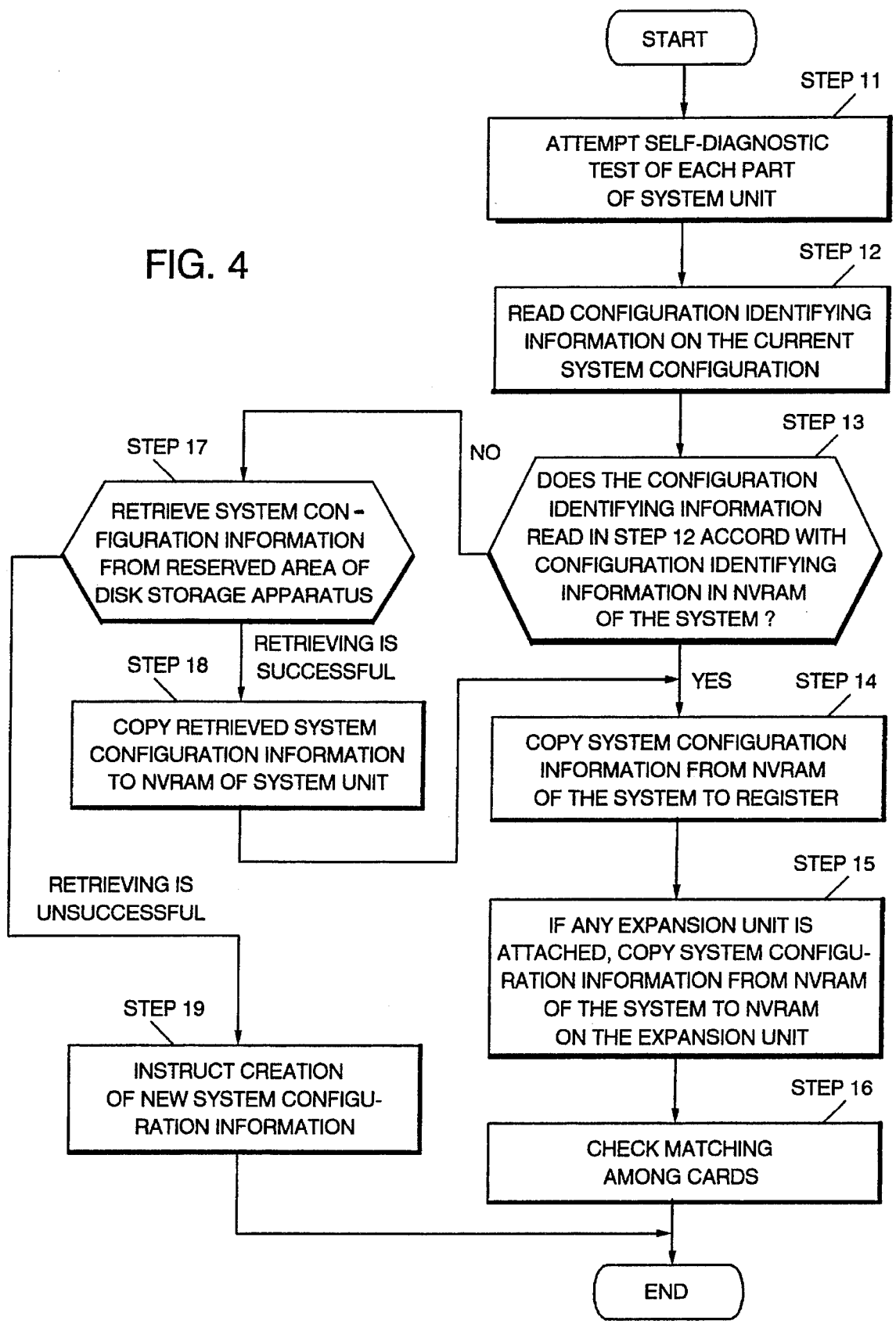
FIG. 4 is a flowchart showing a power on self test (POST) procedure for initializing the system embodiment of FIG. 1 in accordance with the invention.

FIG. 4 shows how backup system configuration information of the invention is used by system POST (power on self test) for system initialization. Actions involved in this process are designated steps 11 through 19. Steps 11 through 13 and 16 correspond to POST actions performed in prior art systems.

In step 11 diagnostic tests are performed on all constituent pads of the system (the system unit itself and its attachments if applicable). In step 12 configuration identifying information is retrieved relative to the system unit I/O slots (and other system ports or elements if applicable). Relative to I/O slots currently connected to adapter cards, the identifying information consists of the respective card ID values, and relative to slots which are empty the identifying information consists of an ID value representing an empty state. In step 13 the identifying information for each system slot is compared to identifying information in system NVRAM 7 associated with the previous state of the respective slot (the state when system unit power was last turned off).

If all comparisons in step 13 are in accord (all ID's retrieved in step 12 agree with respective ID's previously retained in system NVRAM), the process advances directly to step 14, but if any compared ID's disagree the process branches to step 17 for attempting retrieval of backup system configuration information in accordance with the present invention.

In step 14, system configuration information is copied from system NVRAM to registers 23 on any adapter cards that are directly attached to system unit slots. If an expansion unit is currently connected to a system unit slot, step 15 is performed to copy the configuration information relevant to that expansion unit from system NVRAM to the NVRAM on the expansion unit. If no expansion unit is attached, the process ends after step 14, but if an expansion unit is attached step 14 is followed by steps 15 and 16. Step 15 transfers configuration information from NVRAM 7 to the NVRAM in the expansion unit. Step 16 checks that the actual card configuration of the expansion unit matches the information transferred to its NVRAM.

If ID's compared in step 13 disagree, an attempt is made in step 17 to retrieve system configuration information from the reserved area of HDD 9. The action next taken depends upon whether or not the attempt is successful. In step 17, POST compares the configuration identifying information detected in step 12 (ID's of currently attached adapter cards and name of currently attached expansion unit if one is attached) to identifiers in successive indexes in the HDD reserved area to find a matching set of identifiers if an index containing such a set exists.

If an associated index is found, its pointer is used to retrieve the associated system configuration information (see FIG. 2). If the configuration information is successfully retrieved, the process advances to step 18 where the retrieved information is written to the system unit NVRAM, and relevant portions of that information are transferred to registers 23 on the cards and NVRAM on an expansion unit if one is attached (steps 14–16 discussed previously).

If an associated index is not found, or associated system configuration information is not otherwise retrievable, the attempt in step 17 is unsuccessful and the process branches to step 19 to evoke a setup process for the current "new" system configuration. As noted earlier this process may be time consuming, in that it may require system user participation and several rebootings of the system. After successful completion of the setup process, the system is rebooted and the POST process of FIG. 4 is then repeated with a successful retrieval of system configuration information from the HDD, etc.

It should be appreciated that once system configuration is saved to the HDD (or equivalent storage), it is unnecessary to repeat the setup process by which that information is created. Therefore, in system usage environments which are expected to have frequently alterable configurations—exemplified by notebook type systems which are operated in standalone and docked configurations—the invention allows for more efficient operation of the system at each change of configuration.

Furthermore, in such environments, certain failures of attachments to expansion units may be readily detectable since each expansion unit contains a respective NVRAM to store ID's of adapter cards attached to it. Detection of failure or error would result if an ID read from a card attached to the expansion unit did not match the ID associatively held in the NVRAM of that unit. But even if the ID read from a faulty card happened to match that in the expansion unit NVRAM, the resulting state of the expansion unit usually would be erroneous in respect to the active state transferred to that card and the fault would be detectable by other tests.

Furthermore, by assigning unique names to the expansion units, the illustrated embodiment allows for the system to be able to differentiate between identical expansion units having respectively identical card attachments. Thus, for example if the system is connectable to a network through two identical expansion units, each containing identical communication adapter card attachments, the system would be able to assign different communication addresses to the cards in each expansion unit for allowing respective cards to perform different functions in the network. Or if two identical expansion units contained identical type memory extension adapter cards having different memory capacities, this capability would enable the system to differentiate the expansion units and thereby correctly use the amount of memory available in each expansion unit.

Furthermore, the invention allows for automatic retrieval of system configuration information relative to altered configurations of slots that do not connect to expansion units. Thus, if a system is used in a mode in which card connections to slots on either the system unit or an expansion unit are subject to frequent change, the invention would enable the system to avoid unnecessary repetition of setup procedures when card installations are changed to form a pre-existing card configuration.

It also should be understood that although the secondary store for backup copies of system configuration information is shown as a hard disk drive in the described embodiment, it would be feasible to use other storage devices—e.g. optical disk drive, floppy disk drive, EPROM, EEPROM, battery backed up NVRAM, etc.—for the same function, so long as the device used is always accessible at system startup and its stored information is protected against unintentional alteration.

It also should be appreciated that with a large enough system NVRAM, a separate HDD or other storage device would not be needed. With such capability, system configuration information for all previously set up configurations could be stored in the system NVRAM, in association with slot/device ID's and expansion unit names, and selected directly by the POST program for association with any current configuration.

It should be appreciated also that the invention could be useful even in systems not having connectable expansion units, but otherwise subject to dynamic changes of configuration.

We claim:

1. In a data processing system including a system unit and being capable of operating with a variety of I/O adapter units; each I/O adapter unit having an ID associated therewith; said system unit being interconnectable to one or more of said adapter units in a variety of different connection configurations; each connection configuration comprising a distinct system configuration, an arrangement for efficiently initializing the system comprising:

non-volatile storage means retentively storing a system configuration information; said system configuration information comprising IDs of the interconnected I/O adapters forming one of said system configurations;

a backup storage means for storing a plurality of sets of backedup system configuration information corresponding to various different ones of said system configurations; each of said backedup configuration information comprising IDs of the I/O adapters for a corresponding system configuration;

means operative during each initialization of said system for detecting the current configuration of connections between said system unit and said adapter units by determining the IDs of the I/O adapters currently connected to the system unit;

first determination means for determining whether the current configuration matches the configuration stored in the non-volatile storage means;

interrogation means responsive to a determination of a mismatch by said first determination means for interrogating the backedup configuration information by comparing the IDs stored in each set of the backed up system configuration to the IDs of current system configuration;

second determination means for determining whether a backedup system configuration matches the current system configuration retrieving means responsive to the second determination means for retrieving a backedup system configuration matching the current system configuration; and means for adding the current system configuration to the backup storage means if no match is found between the current system and the backedup system configurations.

2. The arrangement of claim 1, further comprising: means for writing the current system configuration into the non-volatile memory.

3. The arrangement of claim 1 wherein said I/O adapter units include I/O adapter storage means for storing configuration information, said arrangement further comprising:

means for writing the current system configuration into the I/O adapter storage means.

4. A data processing system comprising:

a system unit capable of operating with a variety of I/O adapter units;

one or more I/O adapter unit each having an I/O storage means for storing adapter configuration information; said one or more adapter units being interconnectable to said system unit in a variety of different connection configurations; each connection configuration comprising a distinct system configuration;

non-volatile storage means retentively storing a system configuration information;

means operative during each initialization of said system for detecting the current configuration of connections between said system unit and said one or more adapter units;

first determination means for determining whether the current configuration matches the configuration stored in the non-volatile storage means; and means responsive to said first determination means for writing the current system configuration information to I/O storage means only if the current system configuration does not match the configuration stored in the non-volatile storage means.

5. The system of claim 3 further comprising:

a backup storage means for storing a plurality of sets of backedup system configuration information corresponding to various different ones of said system configurations;

interrogation means responsive to said first determination means for interrogating the backedup system configuration information if the current system configuration does not match the configuration stored in the non-volatile storage means;

second determination for determining whether a backedup system configuration matches the current system configuration;

retrieving means responsive to the second determination means for retrieving a backedup system configuration matching the current system configuration; and means for storing the backup configuration into the I/O adapter unit storage means.

6. The system of claim 5 further comprising: means for adding the current system configuration to the backup storage means if no match is found between the current system and the backedup system configurations.

* * * * *